US009837061B2

(12) United States Patent
Gautama

(10) Patent No.: US 9,837,061 B2
(45) Date of Patent: Dec. 5, 2017

(54) SYSTEM AND METHOD FOR BLENDING MULTI-CHANNEL SIGNALS

(71) Applicant: NXP B.V., Eindhoven (NL)

(72) Inventor: Temujin Gautama, Boutersem (BE)

(73) Assignee: NXP B.V., Eindhoven (NL)

( * ) Notice: Subject to any disclaimer, the term of this patent is extended or adjusted under 35 U.S.C. 154(b) by 793 days.

(21) Appl. No.: 14/312,031

(22) Filed: Jun. 23, 2014

(65) Prior Publication Data

US 2015/0371620 A1 Dec. 24, 2015

(51) Int. Cl.

*G06F 17/00* (2006.01)
*G10H 1/18* (2006.01)
*H04H 40/36* (2008.01)
*H04H 20/22* (2008.01)

(52) U.S. Cl.

CPC .............. *G10H 1/18* (2013.01); *H04H 20/22* (2013.01); *H04H 40/36* (2013.01)

(58) Field of Classification Search

CPC ........ H04H 20/22; H04H 20/18; H04H 20/20; H04H 60/12; H04B 1/406; H04N 21/42638

See application file for complete search history.

(56) References Cited

U.S. PATENT DOCUMENTS 6,178,317 B1 * 1/2001 Kroeger .................. H04B 7/12 381/3
6,490,551 B2 12/2002 Wiese et al.
6,590,944 B1 7/2003 Kroeger
8,571,232 B2 10/2013 Goldfarb
2002/0115418 A1 * 8/2002 Wildhagen ............ H04H 20/22 455/133
2004/0043730 A1 * 3/2004 Schill .................... H04H 20/26 455/130
2005/0277393 A1 * 12/2005 Seo ......................... H04B 1/16 455/130
2006/0019601 A1 * 1/2006 Kroeger ................ H04H 20/30 455/3.06
2007/0291876 A1 12/2007 Shridhar et al.
2007/0293167 A1 12/2007 Shridhar et al.
2012/0316663 A1 * 12/2012 Sasanabe .............. H04H 40/18 700/94

(Continued)

FOREIGN PATENT DOCUMENTS

CN 103535052 A 1/2014
JP 2010193117 A 9/2010

(Continued)

OTHER PUBLICATIONS

Extended European Search Report for Application No. 15172033.1 (dated Oct. 21, 2015).

(Continued)

*Primary Examiner* — Andrew C Flanders

(57) ABSTRACT

Embodiments of systems and methods for blending multi-channel signals are described. In one embodiment, a method for blending multi-channel signals involves computing component signals from the multi-channel signals, cross-fading the component signals based on different temporal rates to generate cross-faded component signals and generating a blended multi-channel signal based on the cross-faded component signals. Other embodiments are also described.

11 Claims, 4 Drawing Sheets

(56) References Cited

U.S. PATENT DOCUMENTS

| | | | | |
|---|---|---|---|---|
| 2013/0003894 | A1 | 1/2013 | Elenes et al. | |
| 2013/0279700 | A1* | 10/2013 | Whitecar ............... | H04H 60/12 381/3 |
| 2013/0343547 | A1* | 12/2013 | Pahuja ................... | H04H 40/36 381/2 |
| 2014/0355764 | A1* | 12/2014 | Elenes ................... | H04H 20/88 381/3 |

FOREIGN PATENT DOCUMENTS

| | | | |
|---|---|---|---|
| WO | WO-01/11809 | A1 | 2/2001 |
| WO | WO-2013/075138 | A1 | 5/2013 |

OTHER PUBLICATIONS

Lauber, Pierre et al.; "Error Concealment for Compressed Digital Audio"; Audio Engineering Society Convention Paper 5460; New York, NY; 11 pgs.; Sep. 21-24, 2001.

* cited by examiner

SYSTEM AND METHOD FOR BLENDING MULTI-CHANNEL SIGNALS

Embodiments of the invention relate generally to signal processing systems and methods, and, more particularly, to systems and methods for processing multi-channel signals.

Digital transmission systems can be used to replace traditional analog transmission systems. For example, in digital radio broadcasts, signals are encoded in the digital domain, as opposed to traditional analog broadcasts using Amplitude modulation (AM) or frequency modulation (FM) systems. The received and decoded digital audio signals have a number of advantages over their analog counterparts, such as a better sound quality, and a better robustness to radio interferences (multi-path interference, co-channel noise, etc.).

However, some digital transmission systems are used in combination with analog transmission systems. For example, many radio stations that transmit digital radio also transmit the same program in an analog manner (e.g., in AM or FM). When the reception quality of a digital signal (e.g., an encoded digital audio signal) degrades, the received or encoded signal may contain one or more bit errors. If the bit errors are still present after error detection and error correction have been applied, the corresponding audio frame may not be decodable, and thus, are partially or completely "corrupted." One method of dealing with bit errors is to mute the audio output for a certain period of time (e.g., during one or more frames). Other methods use more advanced error concealment strategies as described in Wiese at el., U.S. Pat. No. 6,490,551. In these strategies, the corrupted signal sections are detected, after which they are replaced by signal sections from the same channel or an adjacent channel. The signal sections may be replaced completely or only one or more frequency bands may be replaced. Another approach involves noise substitution, where an audio frame may be replaced by a noise frame, the spectral envelope of which may be matched to that expected from the audio frame, as described in Lauber et al, "Error concealment for compressed digital audio," In Proceedings of the 111th AES Convention, New York, September 2001.

When two broadcasts of the same content are available (e.g., one digital audio broadcast and one analog audio broadcast or two digital/analog broadcasts of the same program), there is a possibility for a corresponding receiver to switch or cross-fade from one broadcast to the other, for example, when the reception of one broadcast is worse than the reception of another broadcast. Cross-fading between different signals (e.g., different broadcasts) is also referred to as signal blending. However, two multi-channel signals, e.g., a Digital Audio Broadcasting (DAB) stereo signal and an FM stereo signal, can have different stereo information, due to processing that has been performed as a result of bad reception quality. Therefore, when a blending operation from one multi-channel signal to the other multi-channel signal is performed, there can be artifacts as a consequence, especially when there are frequent transitions from one multi-channel signal to the other multi-channel signal and back.

Embodiments of systems and methods for blending multi-channel signals are described. In one embodiment, a method for blending multi-channel signals involves computing component signals from the multi-channel signals, cross-fading the component signals based on different temporal rates to generate cross-faded component signals and generating a blended multi-channel signal based on the cross-faded component signals. By cross-fading component signals of multi-channel signals based on different temporal rates, artifacts caused by signal blending can be reduced. Other embodiments are also described.

In one embodiment, a system for blending multi-channel signals includes a component signals calculation unit configured to compute component signals from the multi-channel signals, a signal cross-fading unit configured to cross-fade the component signals based on different temporal rates to generate cross-faded component signals, and a signal processing unit configured to generate a blended multi-channel signal based on the cross-faded component signals.

In one embodiment, a computer-readable storage medium contains program instructions for blending multi-channel signals. Execution of the program instructions by one or more processors causes the one or more processors to perform steps include computing component signals from the multi-channel signals, cross-fading the component signals based on different temporal rates to generate cross-faded component signals and generating a blended multi-channel signal based on the cross-faded component signals.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
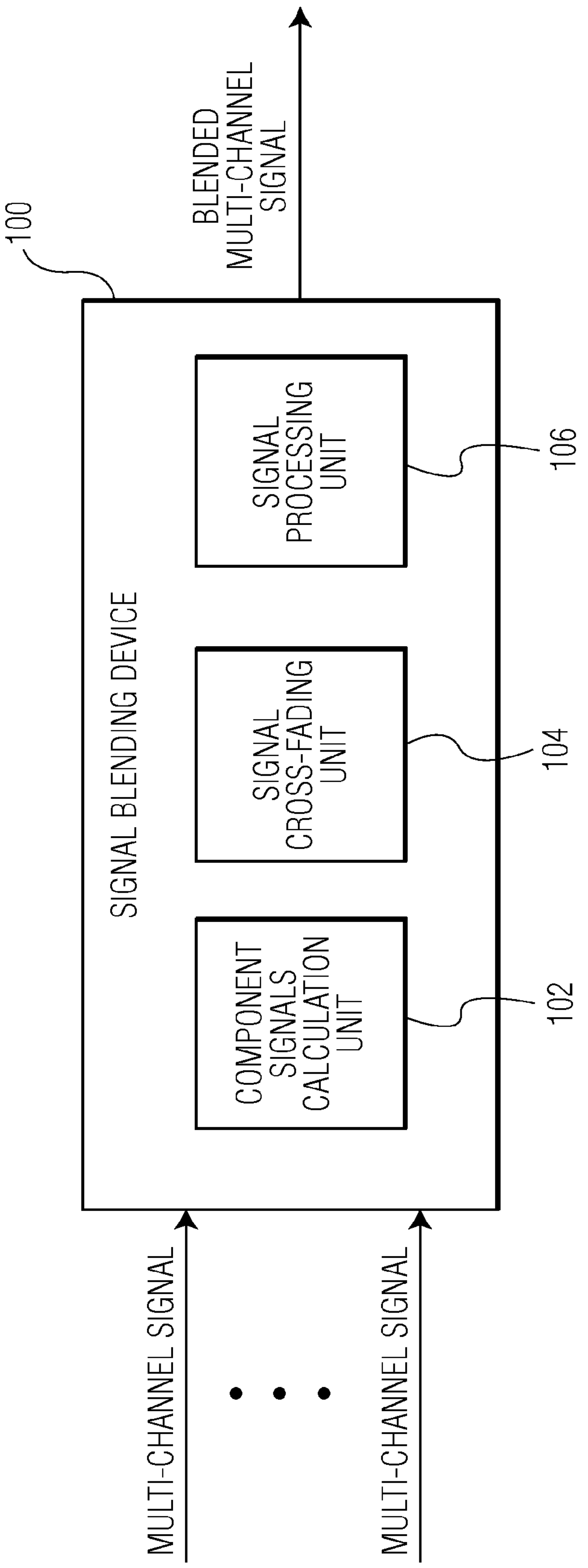
FIG. 1 is a schematic block diagram of a signal blending device in accordance with an embodiment of the invention.

FIG. 1 is a schematic block diagram of a signal blending device 100 in accordance with an embodiment of the invention. The signal blending device can be used to perform signal blending on a number of multi-channel signals, which carry the same content (e.g., the same broadcasting program), to generate a blended multi-channel signal. Alternatively, the signal blending device is also referred to as a signal cross-fading device. Each multi-channel signal typically has two channels, a right channel and a left channel. However, the multi-channel signals may include additional channels. The signal blending device can handle two or more multi-channel signals. In some embodiments, the signal blending device performs signal blending on at least a digital multi-channel signal and an analog multi-channel signal, which may be an Amplitude modulation (AM) signal or a frequency modulation (FM) signal. In some embodiments, the signal blending device performs signal blending on two stereo audio signals. For example, the signal blending device performs signal blending on an FM stereo audio signal and a DAB stereo audio signal that carries the same audio content as the FM stereo audio signal.

In the embodiment depicted in FIG. 1, the signal blending device 100 includes a component signals calculation unit 102, a signal cross-fading unit 104 and a signal processing unit 106. The signal blending device can be implemented in hardware, such as a processor or a receiver circuit and/or software (e.g., computer instructions) stored in a computer-readable storage medium (e.g., memory, cache, disk). Although the signal blending device is shown in FIG. 1 as including certain components, in some embodiments, the signal blending device may include more components to implement additional functionalities. For example, the signal blending device may include an analog-to-digital converter (ADC) that is used to convert an analog multi-channel signal into a digital multi-channel signal.

The component signals calculation unit 102 of the signal blending device 100 is configured to compute component signals from received multi-channel signals, which can be used to carry the same content. In some embodiments, the component signals calculation unit computes a sum signal and a difference signal from each of the multi-channel signals. In one embodiment, the component signals calculation unit generates a sum signal based on the sum of multi-channel components of a multi-channel signal and generates a difference signal based on the difference between the multi-channel components of the multi-channel signal. In some embodiments, the component signals calculation unit includes an optional delay device that is used to synchronize received multi-channel signals.

A component signal of a multi-channel signal can be a combination (e.g., sum or difference) of multiple channels of the multi-channel signal. A component signal of a multi-channel signal can also be a signal that contains a certain type of features, which may be extracted from the multi-channel signal in the time domain or in the frequency domain. A component signal of a multi-channel signal can also be a filtered version of the multi-channel signal (in which case the component signal is also a multi-channel signal) or of a component signal thereof.

The signal cross-fading unit 104 of the signal blending device 100, which can be also referred to as a signal mixing unit, is configured to cross-fade the component signals from the component signals calculation unit 102 based on different temporal rates to generate cross-faded component signals (e.g., a cross-faded sum signal and a cross-faded difference signal). By cross-fading component signals of multi-channel signals based on different temporal rates, artifacts caused by signal blending can be reduced. In some embodiments, the signal cross-fading unit computes a number of mixing factors based on the different temporal rates and mixes the component signals based on the mixing factors. In one embodiment, the signal cross-fading unit calculates a first mixing factor based on a first temporal rate and a second mixing factor based on a second temporal rate such that the transition rate of the first mixing factor is faster than the transition rate of the second mixing factor. In this embodiment, the signal cross-fading unit mixes the sum signals based on the first mixing factor and mixes the difference signals based on the second mixing factor.

The signal processing unit 106 of the signal blending device 100 is configured to generate a blended multi-channel signal based on the cross-faded component signals from the signal cross-fading unit 104. In some embodiments, the signal processing unit generates the blended multi-channel signal based on the sum of the cross-faded component signals and the difference between the cross-faded component signals. The blended multi-channel signal may include a number of multi-channel components. In one embodiment, the signal processing unit generates a first channel of the multi-channel signal based on the sum of the cross-faded component signals and generates a second channel of the multi-channel signal based on the difference between the cross-faded component signals.

Figure 2:
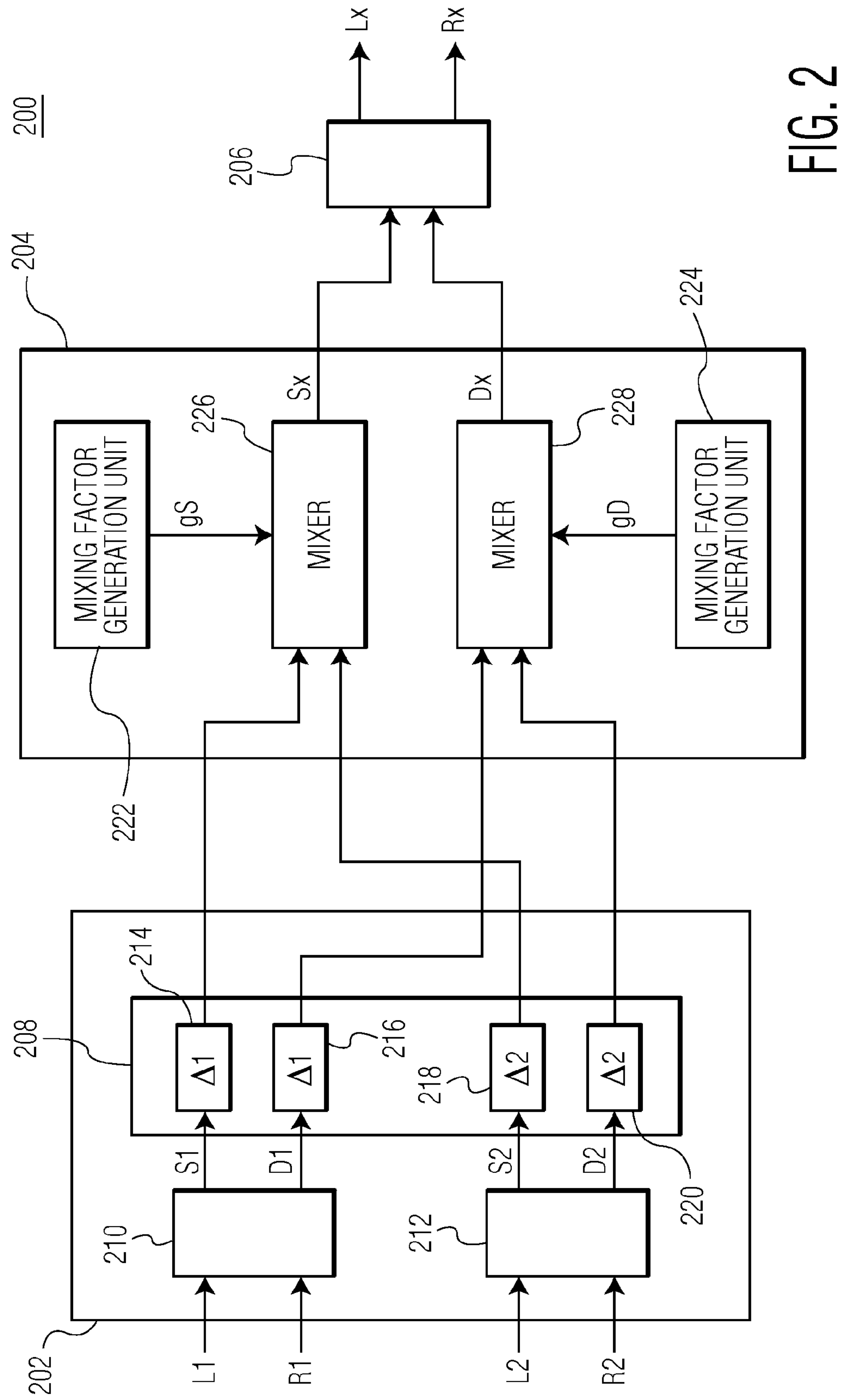
FIG. 2 depicts an embodiment of the signal blending device depicted in FIG. 1.

In some embodiments, the signal blending device 100 is used to perform signal blending or cross-fading on stereo audio signals. FIG. 2 depicts an embodiment of the signal blending device 100 depicted in FIG. 1 that performs signal blending on stereo audio signals. In the embodiment depicted in FIG. 2, the stereo signals are simulcast signals in which the same audio content is received from multiple broadcasts and the two stereo signals are available simultaneously to the signal blending device. For example, one stereo signal is an FM or AM signal and the other stereo signal is a Digital Audio Broadcasting (DAB) signal that carries the same audio content as the FM signal. The left and right channels of a DAB stereo transmission are encoded separately (or at least, for the most part), and a stereo signal is expected to remain a stereo one as the reception quality degrades. However, when the reception quality of an FM transmission degrades, the received audio signal is often changed into a monophonic (mono) signal, which exploits the fact that FM is transmitted as a sum signal and a difference signal, rather than a left channel signal and a right channel signal.

In the embodiment depicted in FIG. 2, the signal blending device 200 includes a component signals calculation unit 202, a signal cross-fading unit or signal mixing unit 204 and a signal processing unit 206. The signal blending device 200 depicted in FIG. 2 can be used in a hybrid radio device that simultaneously receives an FM and a digital radio broadcast of the same program. The signal blending device cross-fades the sum and difference signals of both stereo signals using different temporal rates. The signal blending device may cross-fade the sum signals quickly but may cross-fade the difference signals more slowly. Consequently, a more gradual/slower transition of the stereo content can be achieved during a blending operation and artifacts in the stereo image generated during the blending operation can be reduced. The signal blending device depicted in FIG. 2 is one possible embodiment of the signal blending device 100 depicted in FIG. 1. However, the signal blending device 100 depicted in FIG. 1 is not limited to the embodiment shown in FIG. 2. In some embodiments, the signal blending device may include an analog-to-digital converter (ADC) that is used to convert an analog multi-channel signal into a digital multi-channel signal.

The component signals calculation unit 202 is configured to generate sum signals and difference signals from received two stereo audio signals. In the embodiment depicted in FIG. 2, the two stereo audio signals include a primary signal, which is represented by left and right channel signals, (L1, R1), and a secondary signal, which is represented by left and right channel signals, (L2, R2), respectively. The component signals calculation unit includes a first component signals calculation module 210 configured to generate a sum signal, "S1," and a difference signal, "D1," from the primary stereo audio signal, (L1, R1), and a second component signals calculation module 212 configured to generate a sum signal, "S2," and a difference signal, "D2," of the secondary stereo audio signal, (L2, R2). The sum signals (S1 and S2) and the difference signals (D1 and D2) are computed based on the sum of the stereo signals, (L1, R1), (L2, R2), and the difference between the stereo signals. In some embodiments, the sum signal, S1, and the difference signal, D1, are expressed as:

$$S1 = \frac{L1 + R1}{2}, \quad (1)$$

$$D1 = \frac{L1 - R1}{2}, \quad (2)$$

where L1 represents the left channel signal of the primary stereo audio signal, R1 represents the right channel signal of the primary stereo audio signal, S1 represents the sum signal of the left channel signal and the right channel signal of the primary stereo audio signal, and D1 represents the difference signal of the left channel signal and the right channel signal of the primary stereo audio signal. In some embodiments, the sum signal, S2, and the difference signal, D2, are expressed as:

$$S2 = \frac{L2 + R2}{2}, \quad (3)$$

$$D2 = \frac{L2 - R2}{2}, \quad (4)$$

where L2 represents the left channel signal of the secondary stereo audio signal, R2 represents the right channel signal of the secondary stereo audio signal, S2 represents the sum signal of the left channel signal and the right channel signal of the secondary stereo audio signal, and D2 represents the difference signal of the left channel signal and the right channel signal of the secondary stereo audio signal.

In the embodiment depicted in FIG. 2, the component signals calculation unit 202 includes an optional delay unit 208. The delay unit is configured to delay the sum signals and the difference signals that are generated by the component signals calculation unit. In the embodiment depicted in FIG. 2, the delay unit includes four delay modules 214, 216, 218, 220 configured to delay each of the sum signals and the difference signals of the primary and secondary stereo audio signals, (L1, R1), (L2, R2), respectively. Specifically, the first and second delay modules 214, 216 have the same delay time, "Δ1," while the third and fourth delay modules 218, 220 have the same delay time, "Δ2." In some embodiments, the delay unit sets the delay time/duration such that the primary and secondary signals, (L1, R1), (L2, R2), are synchronized. The delay time may be predefined or estimated previously.

The signal cross-fading unit or the signal mixing unit 204 is configured to mix the delayed sum signals and the delayed difference signals from the delay unit 208, to generate cross-faded sum and difference signals. In the embodiment depicted in FIG. 2, the signal cross-fading unit 204 includes a first mixing factor generation unit 222, a first mixer 226, a second mixing factor generation unit 224 and a second mixer 228. The first mixing factor generation unit 222 is configured to generate a first mixing factor, "gS." The first mixer 226 is configured to mix the sum signals, S1, S2, with the mixing factor, gS, to generate a cross-faded sum signal, "Sx." The second mixing factor generation unit 224 is configured to generate a first mixing factor, "gD." The second mixer 228 is configured to mix the difference signals, D1, D2, with the mixing factor, gD to generate a cross-faded difference signal, "Dx." The mixing factors, gS, gD, are in the range between 0 and 1. In some embodiments, the cross-faded sum signal, Sx, and the cross-faded difference signal, Dx, are expressed as:

$$Sx = gS \cdot S1 + (1 - gS) \cdot S2, \quad (5)$$

$$Dx = gD \cdot D1 + (1 - gD) \cdot D2, \quad (6)$$

where gS and gD represent the mixing factors, S1 and S2 represent the sum signals, and D1 and D2 represent the difference signals. In some embodiments, the mixing factors, gS and gD, are set to 1 or 0 when the signal cross-fading unit does not perform any signal blending operation. If the mixing factors, gS and gD, are set to 1, the output signal (Sx, Dx) of the signal cross-fading unit is equal to the sum, S1, and the difference, D1, of the primary stereo audio signal (L1, R1). If the mixing factors, gS and gD, are set to 0, the output signal (Sx, Dx) of the signal cross-fading unit is equal to the sum, S2, and the difference, D2, of the secondary stereo audio signal (L2, R2).

In some embodiments, the signal cross-fading unit 204 performs a blending operation from the primary stereo audio signal, (L1, R1), to the secondary stereo audio signal, (L2, R2), or vice versa. When a blending operation from the primary stereo audio signal, (L1, R1), to the secondary stereo audio signal, (L2, R2), is initiated, the mixing factors, gS and gD, change from 1 to 0. If the change of the mixing factors, gS and gD, is instantaneous, the result of the blending operation switches from the primary stereo audio signal, (L1, R1), to the secondary stereo audio signal, (L2, R2) so that the output of the signal cross-fading unit 204 is transitioned from the primary stereo audio signal, (L1, R1), to the secondary stereo audio signal, (L2, R2). When the mixing factors, gS and gD, change differently over time, the mono and stereo content are changed differently, which may be used to reduce artifacts in the stereo image during a blending operation.

Figure 3:
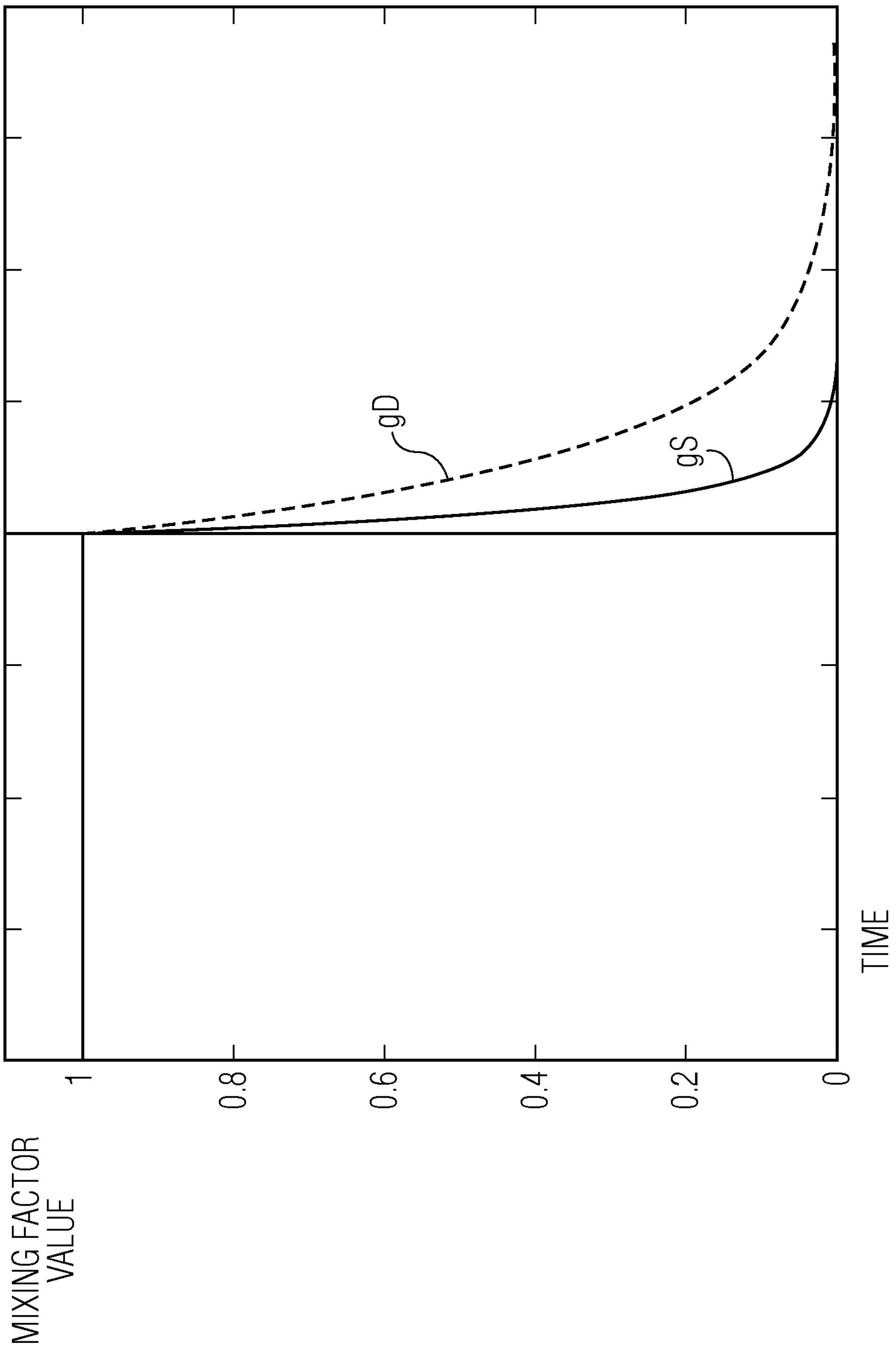
FIG. 3 shows some examples of mixing factors that can be used for the signal blending device depicted in FIG. 2.

FIG. 3 shows some examples of the mixing factors, gS and gD, of the signal cross-fading unit 204 of the signal blending device 200 depicted in FIG. 2. As shown in FIG. 3, each of the mixing factors, gS and gD, are a function of time. Before the blending operation, the mixing factors, gS and gD, are both 1, due to which the output before the blending operation is the primary stereo audio signal. The initiation of the blending operation is represented by the solid vertical line. During the blending operation, the mixing factors, gS, decreases rapidly to 0, due to which the mono information (sum signal) changes rapidly from that of the primary stereo audio to that of the secondary stereo audio signal. The mixing factor, gD, decreases slowly over time, such that the stereo image changes slowly from that of the primary stereo audio signal to that of the secondary stereo audio signal, and consequently, stereo artifacts are reduced.

Turning back to FIG. 2, in some embodiments, each of the mixing factors, gS and gD, of the signal cross-fading unit change over time according to the following transition scheme:

$$g[k+1]=\alpha g[k]+(1-\alpha)g\text{Target}, \qquad (7)$$

where g represents either the mixing factor, gS or gD, gTarget represents a target mixing factor, k presents the sample index, and a represents a smoothing coefficient or an exponential smoothing constant, which is in the range between 0 and 1. In an embodiment, the target mixing factor, gTarget, is set to 0 if the primary stereo audio signal, (L1, R1), is blended to the secondary stereo audio signal, (L2, R2) so that the output of the signal cross-fading unit 204 is transitioned/switched from the primary stereo audio signal, (L1, R1), to the secondary stereo audio signal, (L2, R2). In an embodiment, the target mixing factor, gTarget, is set to 1 if the secondary stereo audio signal, (L2, R2), is blended to the primary stereo audio signal, (L1, R1) so that the output of the signal cross-fading unit 204 is transitioned/switched from the secondary stereo audio signal, (L2, R2), to the primary stereo audio signal, (L1, R1). In some embodiments, the smoothing coefficient, a, for calculating the mixing factor, gS, is different from the smoothing coefficient, a, for calculating the mixing factor, gD.

In some embodiments, the time-scale of the transition (i.e., the change rate with respect to time) of the smoothing coefficient, α, for calculating the mixing factor, gS, or gD, is controlled by a temporal rate or time constant, "τ." In an embodiment, the exponential smoothing constant, α, is expressed as:

$$\alpha = \exp\left(\frac{-1}{\tau f_S}\right), \qquad (8)$$

where α represents the exponential smoothing constant, $f_S$ represents the sampling rate and τ represents the temporal rate. The temporal rate, τ, for calculating the smoothing coefficient, α, can be fixed or variable. In some embodiments, the temporal rate, τ, for calculating the smoothing coefficient, α, that is used for calculating the mixing factor, gS, is different from the temporal rate, τ, for calculating the smoothing coefficient, a, that is used for calculating the mixing factor, gD. In some embodiments, the temporal rate, τ, is a function of the difference between stereo components of the received stereo audio signals. In an embodiment, the temporal rate, τ, for the cross-fading of the difference signals, D1, D2, (i.e., for calculating the mixing factor, gD,) is a function of the ratio (referred to as the power ratio) between the powers/magnitudes of the difference signals, D1, D2, possibly weighted in frequency. In this embodiment, the temporal rate, τ, is relatively small if the power ratio is close to unity, and the temporal rate, τ, is relatively large if the power ratio is further away from unity. The cross-fading of the difference signals is fast when the stereo content in the primary and secondary stereo audio signals is comparable in power while the cross-fading of the difference signals is slow when there is a difference in stereo content in the primary and secondary stereo audio signals.

The signal processing unit 208 is configured to generate a cross-faded stereo audio signal, (Lx, Dx), from the cross-faded sum and difference signals, Sx, Dx, from the signal cross-fading unit 204. In some embodiments, the cross-faded left channel signal and the cross-faded right channel signal are expressed as:

$$Lx = \frac{Sx + Dx}{2}, \qquad (9)$$

$$Rx = \frac{Sx - Dx}{2}, \qquad (10)$$

where Lx represents the cross-faded left channel signal, Rx represents the cross-faded right channel signal, Sx represents the cross-faded sum signal, and Dx represents the cross-faded difference signal.

Figure 4:
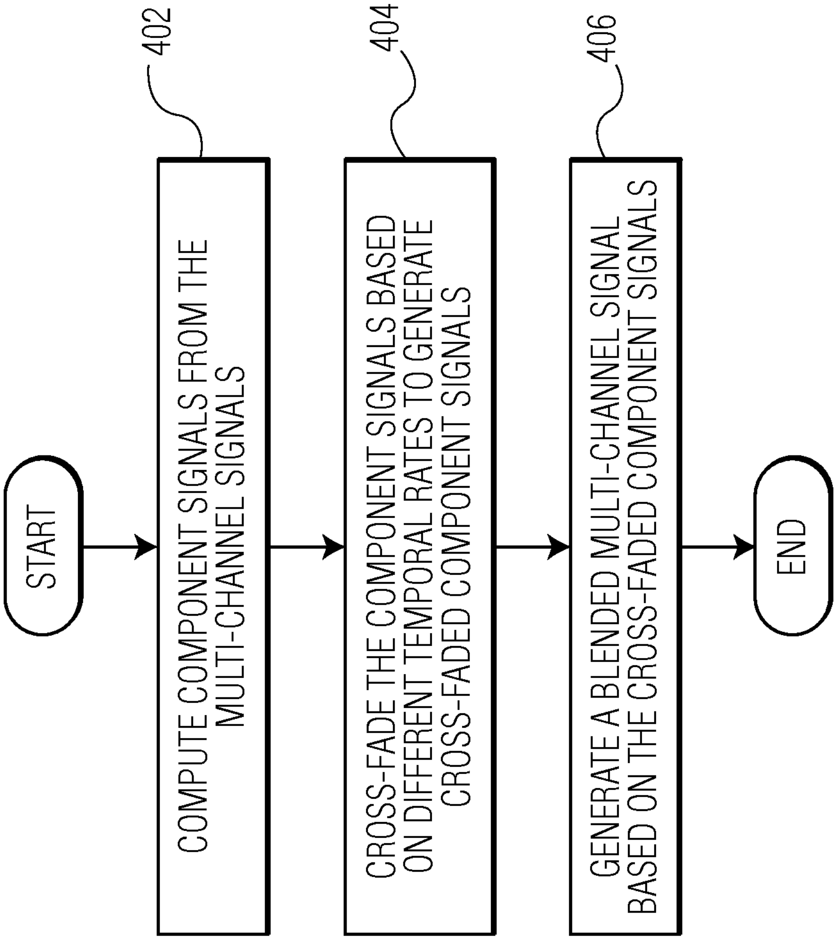
FIG. 4 is a process flow diagram of a method for blending multi-channel signals in accordance with an embodiment of the invention.

FIG. 4 is a process flow diagram of a method for blending multi-channel signals in accordance with an embodiment of the invention. At block 402, component signals are computed from the multi-channel signals. At block 404, the component signals are cross-faded based on different temporal rates to generate cross-faded component signals. At block 406, a blended multi-channel signal is generated based on the cross-faded component signals.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on one or more processors, causes the one or more processors to perform operations, as described herein.

In addition, embodiments of at least portions of the invention can take the form of a computer program product accessible from a computer-usable or computer-readable medium providing program code for use by or in connection with a processor, a computer or any instruction execution system. For the purposes of this description, a computer-usable or computer readable medium can be any apparatus that can contain, store, communicate, propagate, or transport the program for use by or in connection with the instruction execution system, apparatus, or device. The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. An article of manufacture comprises at least one non-transitory, tangible machine readable storage medium containing executable machine instructions for blending multi-channel signals, wherein execution of the program instructions by one or more processors causes the one or more processors to perform steps comprising:

computing component signals from the multi-channel signals;

cross-fading the component signals based on different temporal rates to generate cross-faded component signals; and generating a blended multi-channel signal based on the cross-faded component signals;

wherein cross-fading the component signals based on the different temporal rates comprises:

computing a plurality of mixing factors based on the different temporal rates; and mixing the component signals based on the mixing factors;

wherein computing the component signals from the multi-channel signals comprises computing a sum signal and a difference signal from each of the multi-channel signals;

wherein computing the mixing factors based on the different temporal rates comprises:

calculating a first mixing factor based on a first temporal rate; and calculating a second mixing factor based on a second temporal rate such that a transition rate of the first mixing factor is faster than a transition rate of the second mixing factor; and wherein mixing the component signals based on the mixing factors comprises:

mixing the sum signals based on the first mixing factor; and mixing the difference signals based on the second mixing factor.

2. The article of manufacture of claim 1, wherein computing the component signals from the multi-channel signals comprises computing the component signals such that each of the component signals is selected from the group consisting of:

a combination of a plurality of channels of the multi-channel signal;

a signal that contains a plurality of features extracted from the multi-channel signal in the time domain or in the frequency domain; and a filtered version of the multi-channel signal.

3. The article of manufacture of claim 1, wherein generating the blended multi-channel signal based on the cross-faded component signals comprises:

generating the blended multi-channel signal based on the sum of the cross-faded component signals and the difference between the cross-faded component signals.

4. The article of manufacture of claim 1, wherein the blended multi-channel signal comprises a plurality of channels, wherein generating the blended multi-channel signal based on the cross-faded component signals comprises:

generating each channel of the multi-channel signal based on a combination of the cross-faded component signals.

5. The article of manufacture of claim 1, wherein the multi-channel signals comprise two stereo audio signals.

6. The article of manufacture of claim 5, wherein cross-fading the component signals based on the different temporal rates comprises:

generating at least one of the different temporal rates as a function of the difference between stereo components of the two stereo audio signals.

7. The article of manufacture of claim 5, wherein the two stereo audio signals comprise a frequency modulation (FM) stereo audio signal and a Digital Audio Broadcasting (DAB) stereo audio signal that carries the same audio content as the FM stereo audio signal.

8. The article of manufacture of claim 1, wherein the steps further comprise delaying the component signals such that the component signals are synchronized.

9. A system for blending multi-channel signals, the system comprising:

a component signals calculation unit configured to compute component signals from the multi-channel signals;

a signal cross-fading unit configured to cross-fade the component signals based on different temporal rates to generate cross-faded component signals; and a signal processing unit configured to generate a blended multi-channel signal based on the cross-faded component signals;

wherein the signal cross-fading unit is further configured to:

compute a plurality of mixing factors based on the different temporal rates; and mix the component signals based on the mixing factors;

wherein the component signals calculation unit is further configured to compute a sum signal and a difference signal from each of the multi-channel signals; and wherein the signal cross-fading unit is further configured to:

calculate a first mixing factor based on a first temporal rate; and calculate a second mixing factor based on a second temporal rate such that a transition rate of the first mixing factor is faster than a transition rate of the second mixing factor;

mix the sum signals based on the first mixing factor; and mix the difference signals based on the second mixing factor.

10. The system of claim 9, wherein each of the component signals is selected from the group consisting of:

a combination of a plurality of channels of the multi-channel signal;

a signal that contains a plurality of features extracted from the multi-channel signal in the time domain or in the frequency domain; and a filtered version of the multi-channel signal.

11. A system for blending multi-channel signals, the system comprising:

a component signals calculation unit configured to compute component signals from the multi-channel signals;

a signal cross-fading unit configured to cross-fade the component signals based on different temporal rates to generate cross-faded component signals; and a signal processing unit configured to generate a blended multi-channel signal based on the cross-faded component signals;

wherein the multi-channel signals comprise a first stereo audio signal and a second stereo audio signal that carries the same audio content as the first stereo audio signal, wherein the component signals calculation unit is further configured to:

compute a first sum signal and a first difference signal from the first stereo audio signal; and compute a second sum signal and a second difference signal from the second stereo audio signal, wherein the signal cross-fading unit is further configured to:

cross-fade the first and second sum signals based on a first temporal rate to generate a cross-faded sum signal; and cross-fade the first and second difference signals based on a second temporal rate to generate a cross-faded difference signal, wherein the second temporal rate is different from the first temporal rate, wherein the signal processing unit is further configured to:

generate a blended stereo audio signal based on the cross-faded sum signal and the cross-faded difference signal.

* * * * *